US012615292B2

(12) United States Patent
Roytman

(10) Patent No.: US 12,615,292 B2
(45) Date of Patent: Apr. 28, 2026

(54) SYSTEM AND METHOD FOR DETECTING MALICIOUS MESSAGES GENERATED BY A LARGE LANGUAGE MODEL (LLM)

(71) Applicant: Cisco Technology, Inc., San Jose, CA (US)

(72) Inventor: Michael Roytman, Swannanoa, NC (US)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 18/351,195

(22) Filed: Jul. 12, 2023

(65) Prior Publication Data

US 2025/0023913 A1     Jan. 16, 2025

(51) Int. Cl.
| | |
|---|---|
| *H04L 29/06* | (2006.01) |
| *H04L 9/40* | (2022.01) |
| *H04L 41/16* | (2022.01) |

(52) U.S. Cl.
CPC .......... *H04L 63/1483* (2013.01); *H04L 41/16* (2013.01)

(58) Field of Classification Search
CPC ............................ H04L 63/1483; H04L 41/16
See application file for complete search history.

(56) References Cited

U.S. PATENT DOCUMENTS

| | | | |
|---|---|---|---|
| 10,581,898 B1 | 3/2020 | Singh | |
| 2016/0344770 A1 | 11/2016 | Verma et al. | |
| 2017/0237776 A1 | 8/2017 | Higbee et al. | |
| 2021/0266345 A1 | 8/2021 | Chen et al. | |
| 2021/0352093 A1* | 11/2021 | Hassanzadeh | ...... H04L 63/1416 |
| 2024/0333746 A1* | 10/2024 | Williams | ................ H04L 51/02 |
| 2025/0005150 A1* | 1/2025 | Kumar | .................... G06F 21/56 |

OTHER PUBLICATIONS

Tushkanov V., "What Does ChatGPT Know About Phishing?", Securelist, May 1, 2023, pp. 1-14.

* cited by examiner

*Primary Examiner* — Wasika Nipa
(74) *Attorney, Agent, or Firm* — Polsinelli P.C.

(57)     ABSTRACT
A system and method are provided for detecting malicious messages using a two-step Bayesian approach. A discrimination engine determines for each of the messages a first score and a second score. The first score represents a likelihood that the respective messages are malicious messages, and the second score represents a likelihood that they were generated by a machine learning (ML) method, such as a large language model (LLM). Using a combination of these two scores, message with a high probability of being malicious message are discriminated and marked as such. For example, messages for which the first and second scores exceed respective thresholds are marked as suspicious.

16 Claims, 6 Drawing Sheets

300

DETERMINE A FIRST SCORE FOR RESPECTIVE MESSAGES REPRESENTING A LIKELIHOOD THAT A MESSAGE IS A MALICIOUS MESSAGE 302

DETERMINE A FIRST SET OF THE MESSAGES BASED ON THE CORRESPONDING FIRST SCORE EXCEEDING A FIRST THRESHOLD 304

DETERMINE A SECOND SCORE REPRESENTING A LIKELIHOOD THAT A MESSAGE IS GENERATED USING A MACHINE LEARNING (ML) METHOD 306

SIGNAL THAT THOSE MESSAGES FOR WHICH THE FIST SCORE THAT EXCEEDS THE FIRS THRESHOLD AND THE SECOND SCORE THAT EXCEEDS A SECOND THRESHOLD ARE SUSPECTED TO BE MALICIOUS MESSAGES 308

RECEIVE USER FEEDBACK REGARDING WHICH OF THE MESSAGES ARE MALICIOUS MESSAGES 310

PERFORM REINFORCEMENT LEARNING BASED ON THE USER FEEDBACK TO REFINE THE PROCESSES USED TO DETERMINE THE FIRST SCORE AND/OR THE SECOND SCORE 312

FIG. 3

SYSTEM AND METHOD FOR DETECTING MALICIOUS MESSAGES GENERATED BY A LARGE LANGUAGE MODEL (LLM)

BACKGROUND

Phishing is a form of social engineering where attackers deceive people into revealing sensitive information or installing malware. Over time perpetrators of phishing attacks have refined their techniques, and phishing attacks have become increasingly sophisticated.

In email phishing, emails from the attacker are disguised to appear like legitimate emails to deceive the receiver into a comprising action. For example, this method of social engineering attack uses fraudulent emails that appear to be from a trusted source, such as a bank, an online retailer, or a government agency. These emails can contain a link or attachment that, when clicked, installs malware automatically on the targeted device or redirects the email recipient to a fake login page that is made to appear like a trusted website where the email recipient will be promoted to enter their login credential.

These phishing attacks, often use email spam to trick individuals into giving away sensitive information or login credentials. Often these attacks are bulk attacks that are not targeted and are instead sent in bulk to a wide audience. The goal of the attacker can vary, with common targets including financial institutions, email and cloud productivity providers, and streaming services. The stolen information or access may be used to steal money, install malware, or spear phish others within the target organization.

Another type of phishing attack is spear phishing. Spear phishing is a targeted phishing attack that uses personalized emails to trick a specific individual or organization into believing that the emails are legitimate. It often utilizes personal information about the target to increase the likelihood of success.

As email users become better at detecting and avoiding phishing attacks, attackers also become better at disguising such attacks. For example, email users have previously been able to recognize phishing emails by looking for several indicators, including, e.g., (i) checking the "from" email address for signs of fraudulence; (ii) watching for misspellings and incorrect grammar; (iii) being suspicious of hyperlinks; (iv) being careful with all attachments; and (v) being skeptical of urgent messages.

Better detection systems are desired to protect email users from email phishing attacks that are harder to detect, such as those generated by an LLM.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a flow diagram of an example of method 300 for discriminating malicious messages, in accordance with certain embodiments.

DESCRIPTION OF EXAMPLE EMBODIMENTS

Figures 1A, 1B:
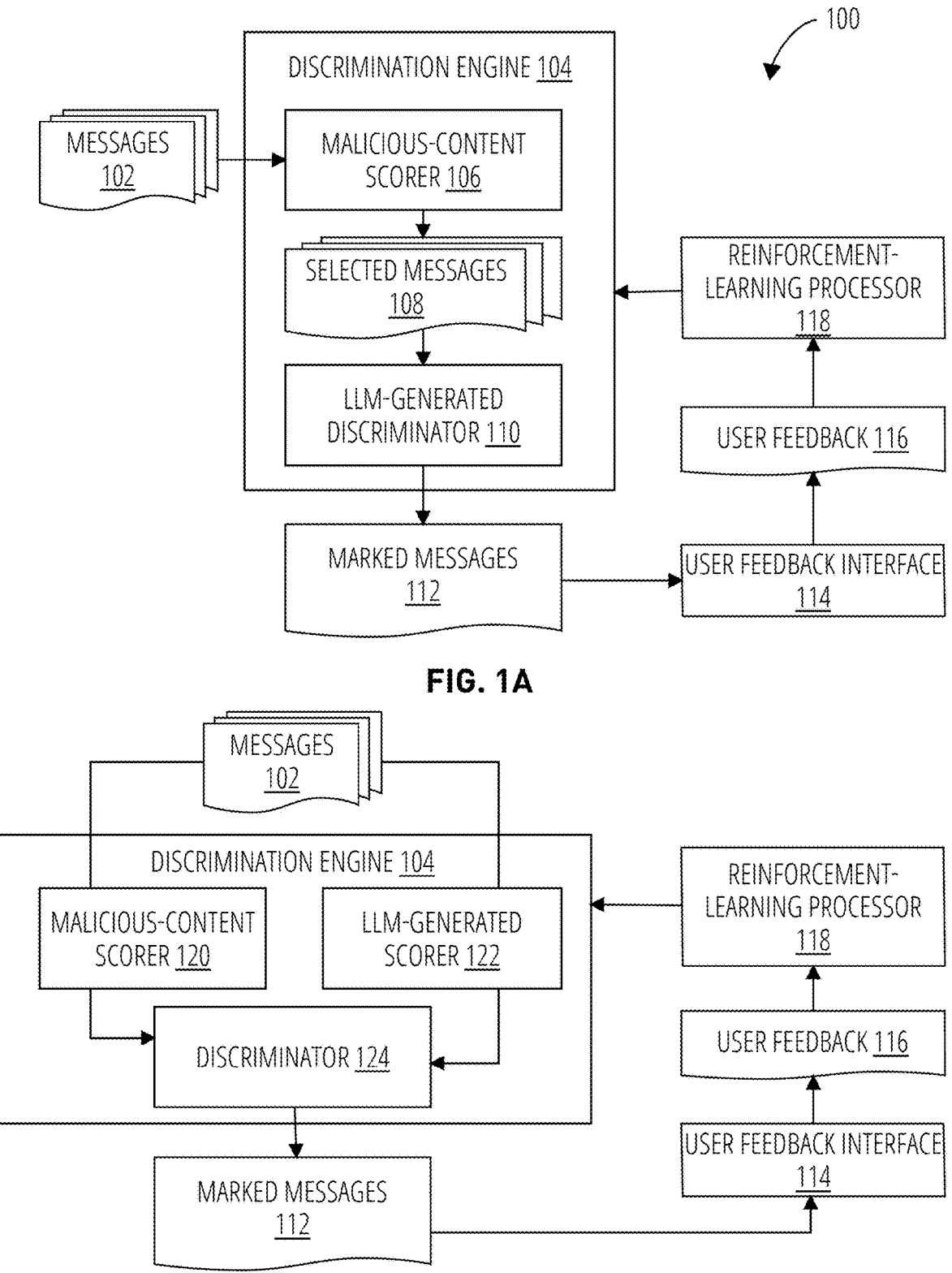
FIG. 1A illustrates a block diagram of an example of a series configuration of a malicious message classifying system, in accordance with certain embodiments.
FIG. 1B illustrates a block diagram of an example of a parallel configuration of a malicious message classifying system, in accordance with certain embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In one aspect, a method is provided for detecting malicious messages. The method includes: determining, using a discrimination engine, a first score for a plurality of messages, wherein, for a respective message, a corresponding value of the first score represents a likelihood that the respective messages is a malicious message; determining, using the discrimination engine, a second score for a set of messages of the plurality of messages, wherein, for the respective message, a corresponding value of the second score represents a likelihood that the respective messages has been generated using one or more machine learning (ML) methods; and signaling, based on both the first score and the second score, that one or more messages of the plurality of messages are suspected to be malicious messages.

In another aspect, the method may also include determining the second score for the set of messages, wherein the of message includes all messages of the plurality of messages.

In another aspect, the method may also include determining a subset of the plurality of messages for which each message of the subset has the first score that exceeds a first threshold and has the second score that exceeds a second threshold; and including the subset in the one or more messages that are signaled as being suspected to be malicious messages.

In another aspect, the method may also include determining a first subset of the plurality of messages for which each message has a first score that exceeds a first threshold; determining the second score for only messages of the first subset; determining a second subset of the first subset for which each message of the first subset has a second score that exceeds a second threshold; and including the second subset in the one or more messages that are signaled as being suspected to be malicious messages.

In another aspect, the method may also include determining a third subset of the plurality of messages for which the first score exceeds a third threshold that is greater than the first threshold, wherein the third subset is determined without comparing the second score to the second threshold; and including the third subset in the one or more messages that are signaled as being suspected to be malicious messages.

In another aspect, the method may also include determining the first score further comprises determining the first score to represent a likelihood that the message is a phishing email; and signaling the one or more messages are suspected to be malicious messages further comprises signaling the one or more messages are suspected to be phishing emails.

In another aspect, the method may also include determining the first score further comprises determining the first score to represent a likelihood that the message is a social-media message conveying misinformation; and signaling the one or more messages are suspected to be malicious messages further comprises signaling the one or more messages are suspected to be social-media messages conveying misinformation.

In another aspect, the method may also include determining the first score further comprises determining the first score to represent a likelihood that the message is a review of a product from a non-user of the product; and signaling the one or more messages are suspected to be malicious messages further comprises signaling the one or more messages are suspected to be fake reviews of the product.

In another aspect, the method may also include that the discrimination engine comprises a first ML method and a second ML method. The first ML method determines the first score. The second ML method determines the second score, the second ML method having been trained to discriminate whether messages are generated by a large language model (LLM) by using training data that comprises training messages that are labeled according to whether the training messages were generated by one or more LLMs.

In another aspect, the method may also include receiving user feedback indicating which of the plurality of messages that are suspected to be malicious messages are malicious messages; and performing reinforcement learning on the discrimination engine based on the received user feedback.

In another aspect, the method may also include receiving user feedback indicating which of the plurality of messages that are suspected to be malicious messages have been generated using the one or more ML methods; and performing reinforcement learning on the discrimination engine based on the received user feedback.

In one aspect, a computing apparatus includes a processor. The computing apparatus also includes a memory storing instructions that, when executed by the processor, configure the apparatus to: determine a first score for a plurality of messages for a plurality of messages, a discrimination engine of the apparatus being configured to determine the first score, wherein, for a respective message, a corresponding value of the first score represents a likelihood that the respective messages is a malicious message; use the discrimination engine to determine a second score for a set of messages of the plurality of messages, wherein, for the respective message, a corresponding value of the second score represents a likelihood that the respective messages has been generated using one or more machine learning (ML) methods; and signal, based on both the first score and the second score, that one or more messages of the plurality of messages are suspected to be malicious messages.

In another aspect, the computing apparatus may also include that when executed by the processor, the instructions stored in the memory cause the processor to: determine the second score for the set of messages, wherein the of message includes all messages of the plurality of messages; determine a subset of the plurality of messages for which each message of the subset has the first score that exceeds a first threshold and has the second score that exceeds a second threshold; and include the subset in the one or more messages that are signaled as being suspected to be malicious messages.

In another aspect, the computing apparatus may also include that when executed by the processor, the instructions stored in the memory cause the processor to: determine a first subset of the plurality of messages for which each message has a first score that exceeds a first threshold; determine the second score for only messages of the first subset; determine a second subset of the first subset for which each message of the first subset has a second score that exceeds a second threshold; and include the second subset in the one or more messages that are signaled as being suspected to be malicious messages.

In another aspect, the computing apparatus may also include that when executed by the processor, the instructions stored in the memory cause the processor to: determine a third subset of the plurality of messages for which the first score exceeds a third threshold that is greater than the first threshold, wherein the third subset is determined without comparing the second score to the second threshold; and include the third subset in the one or more messages that are signaled as being suspected to be malicious messages.

In another aspect, the computing apparatus may also include that when executed by the processor, the instructions stored in the memory cause the processor to: determine the first score further comprises determining the first score to represent a likelihood that the message is a phishing email, and signal the one or more messages are suspected to be malicious messages further comprises signaling the one or more messages are suspected to be phishing emails.

In another aspect, the computing apparatus may also include that when executed by the processor, the instructions stored in the memory cause the processor to: determine the first score further comprises determining the first score to represent a likelihood that the message is a social-media message conveying misinformation, and signal the one or more messages are suspected to be malicious messages further comprises signaling the one or more messages are suspected to be social-media messages conveying misinformation.

In another aspect, the computing apparatus may also include that when executed by the processor, the instructions stored in the memory cause the processor to: determine the first score further comprises determining the first score to represent a likelihood that the message is a review of a product from a non-user of the product, and signal the one or more messages are suspected to be malicious messages further comprises signaling the one or more messages are suspected to be fake reviews of the product.

In another aspect, the computing apparatus may also include that the discrimination engine comprises a first ML method and a second ML method; the first ML method determines the first score; and the second ML method determines the second score, the second ML method having been trained to discriminate whether messages are generated by a large language model (LLM) by using training data that comprises training messages that are labeled according to whether the training messages were generated by one or more LLMs.

In another aspect, the computing apparatus may also include that when executed by the processor, the instructions stored in the memory cause the processor to: receive user feedback regarding a suspected message of the one or more messages that are signaled as suspected to be malicious messages, the user feedback indicating whether the suspected message is a malicious message or whether the suspected message has been generated using the one or more ML methods; and performing reinforcement learning on the discrimination engine based on the received user feedback.

In another aspect, the computing apparatus may also include that when executed by the processor, the instructions stored in the memory cause the processor to: provide, in a user interface, a visual indicator that the one or more messages are suspected to be malicious messages; receive, from the user interface, a user input that indicates whether the respective messages of the one or more messages are malicious messages or have been generated using the one or more ML methods.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for improved detection of malicious messages, especially those messages that circumvent and avoid traditional detection methods by using an LLM. The systems and methods disclosed herein use a two-step Bayesian inference approach based on both a likelihood that the message is malicious and a likelihood that the message was generated using an LLM.

As discussed above, better detection systems are desired to protect email users from better disguised email phishing attacks. As email users become more sophisticated in detecting and avoiding phishing attacks, attackers also become more sophisticated in disguising such attacks. Previously, email users have been able to recognize phishing emails by looking for several indicators, including, e.g., (i) checking the "from" email address for signs of fraudulence; (ii) watching for misspellings and incorrect grammar; (iii) being suspicious of hyperlinks; (iv) being careful with all attachments; and (v) being skeptical of urgent messages.

Attackers can use emerging technologies such as large language models (LLM) (e.g., CHATGPT) to make phishing emails harder to detect and therefore harder to remediate. When LLMs are used to generate the phishing emails, the challenge of discriminating phishing emails from legitimate emails can become more difficult because the LLM can obfuscate some of the indicators that were previously used to detect phishing emails. For example, as the performance of LLMs continues to improve, LLMs can be used to generate grammatically-correct, misspelling-free prose that lacks many of the features commonly associated with and used to detect phishing emails.

Machine learning (ML) methods can be used to learn hidden patterns in data, such as text messages or emails. Using these learned patterns, the ML methods can be used to discriminate between legitimate messages and malicious messages. For example, ML methods can screen incoming emails and detect which emails are likely to be phishing emails.

To overcome the challenges presented by LLM-generated phishing emails (and other malicious messages), a two-step Bayesian inference approach can be used to detect which emails are likely to be phishing emails and which emails are likely to be LLM-generated emails. According to certain non-limiting examples, a first ML method can be trained using a first set of training data that is labeled according to which emails are phishing emails. Thus, the first ML method learns patterns to detect phishing emails.

A second ML method can be trained using a second set of training data that is labeled according to whether the emails were generated using an LLM. Thus, the second ML method learns patterns to detect LLM-generated emails.

According to certain non-limiting examples, these two ML methods can generate respective scores. The first score, which is generated by the first ML method, represents the likelihood of a given message being a phishing email. The second score, which is generated by the second ML method, represents the likelihood of the given message having been generated using an LLM.

The two-step Bayesian inference approach detects phishing emails using both the first and second scores to infer which emails are phishing emails, thereby enabling the two-step Bayesian inference approach to detect LLM-generated phishing emails that would otherwise elude detection. Consider the alternative of a single-step Bayesian inference approach that relies solely on the first score by signaling that values of the first score above a cut-off threshold correspond to likely phishing emails. In this case, a subset of phishing emails that are generated by LLM may avoid detection when only the first score is used because the LLM may obscure or circumvent certain indicators associated with phishing emails.

Even though this subset of LLM-generated, phishing emails have values for the first score that fall below the cut-off threshold, this subset of LLM-generated, phishing emails can nevertheless be detected using a combination of the first score and the second score. When the second score indicates that an email was likely to have been generated by an LLM and the first score indicates that the email is within a predefined range below the cut-off threshold, then the email can also be inferred as likely being a phishing email. Thus, the two-step Bayesian inference approach can capture phishing emails that would not be captured using only the first score and the cut-off threshold.

The two-step Bayesian inference approach can be used to detect several different types of malicious messages of which phishing emails are just one non-limiting example of a type of malicious message. The example of phishing emails is a non-limiting example of malicious messages, which is used to illustrate and motivate the two-step Bayesian inference approach disclosed herein for detecting malicious messages. The two-step Bayesian inference approach can especially be used for those messages that avoid detection due to being generated using an LLM.

The two-step Bayesian inference approach disclosed herein applies generally to all malicious messages—not just phishing emails. Rather, the two-step Bayesian approach can be used to detect any type of malicious messages that exhibits a correlation (or anticorrelation) with being generated by an LLM, such as illustrated herein for phishing emails.

For example, the two-step Bayesian approach can be used to detect fake product reviews. Fake product reviews can be found on websites of online retailers that allow purchasers of a product to provide reviews and ratings of the purchased products (e.g., text expounding the virtues of a product that accompanies a five-star review/rating). Fake product reviews are generated, e.g., by sellers who try to influence buyers to purchase the product by falsifying positive reviews. A ML method can be used to generate a first score that is used to discriminate between those product reviews that are likely legitimate and those product reviews that are likely fraudulent. Further, a product review that is generated by an LLM is more likely to be fraudulent. Thus, the detection of fake reviews can be improved by using the additional information provided by the second score, which represents the likelihood of the review having been generated by an LLM.

In another example, social media posts can be used to manipulate users' behavior, such as during a political election. Social-media companies may seek to safeguard their product from entities (e.g., foreign governments) seeking to unduly influence users' behavior (e.g., users' voting behavior in a political election) by detecting and curtailing malicious social-media messages. Such policing of the social-media platform can increase users' trust in the social-media platform, resulting in a higher level of user engagement with the social-media platform and increased advertising profits for the social-media company. Here, as in the previous cases, a correlation may exist between malicious social-media messages and LLM-generated social-media messages. Consequently, the two-step Bayesian approach can be beneficially applied to detect malicious social-media messages and to mark such messages for remediating action.

FIG. 1A illustrates a non-limiting example of a malicious message classifying system 100. The malicious message classifying system 100 in FIG. 1A includes messages 102, a discrimination engine 104 that includes a malicious-content scorer 106 and an LLM-generated discriminator 110. The malicious-content scorer 106 selects the selected messages 108 from all messages 102, and the selected messages 108 are provided as an input to the LLM-generated discriminator 110, which outputs marked messages 112. The malicious message classifying system 100 in FIG. 1A also includes a user feedback interface 114 that provides user feedback 116, which is used by the reinforcement-learning processor 118 to improve the discrimination engine 104.

The malicious-content scorer 106 receives messages 102 and generates a first score that corresponds to a likelihood that the respective messages 102 are malicious. A subset of the messages 102 (i.e., the selected messages 108) are determined based on the first score. For example, the first score can be compared to a first threshold and the selected messages 108 can be those messages for which the first score exceeds the first threshold.

Next, the LLM-generated discriminator 110 generates a second score that corresponds to a likelihood that the respective messages 102 are generated by a large language model (LLM). LLMs are machine learning (ML) methods that generate text based on a user-provided prompt. Using the second score, the LLM-generated discriminator 110 determines a set of marked messages 112, which are marked/flagged for a remediating action. Examples of the remediating action can include, e.g., displaying an alert to users that the message is suspected as being malicious, quarantining the message, alerting a network administrator to the suspicious nature of the message, or other actions for remediating suspicious messages.

A user feedback interface 114 provides user interactions to generate user feedback 116. For example, a graphical user interface (GUI) can show a warning message alerting users that the message is suspected of being malicious. The GUI can provide a radio button, check box, or other mechanism whereby the user can confirm that the message is malicious or not. The user feedback 116 can also include information from the user regarding whether the message is generated by an LLM.

The user feedback 116 is then combined with and associated with the messages 102 to generate labeled data that is used as training data by the reinforcement-learning processor 118 to train and update the ML methods used in the malicious-content scorers 106 and/or the LLM-generated discriminator 110.

As described below, the various ML methods disclosed herein (e.g., the malicious-content scorers 106, the LLM-generated discriminator 110, the malicious-content scorers 120, and the LLM-generated scorer 122) can be trained initially, and then can undergo continuous reinforcement learning based on the user feedback 116.

For example, in addition to the initial training of the respective ML methods, the reinforcement-learning processor 118 provides ongoing training of the ML methods based on the user feedback 116. As the LLM algorithms evolve over time, the second ML algorithm (e.g., the malicious-content scorers 106 and the malicious-content scorers 120) benefit from ongoing training to remain current. User feedback 116 can be used to perform reinforcement learning for the second ML algorithm. For example, a suspected email may be automatically flagged and brought to the attention of the users (or network administrators) who then review the suspected email and determines the email is safe (e.g., by clicking a button labeled "safe") or the user can signal that the email is phishing (e.g., by clicking a button labeled "phishing"). The user can also provide feedback indicating whether they believe the email was generated using an LLM (e.g., by clicking a button labeled "LLM generated").

An alternative malicious message classifying system 100 is illustrated in FIG. 1B. This system comprises the messages 102, which are provided as inputs to the discrimination engine 104 that includes the malicious-content scorer 120 and the LLM-generated scorer 122. Based on these messages 102, the malicious-content scorer 120 and the LLM-generated scorer 122 provide scores to the discriminator 124. Based on these scores, the discriminator 124 generates the marked messages 112.

Like in FIG. 1A, the user feedback interface 114 provides the marked messages 112 to a user to generate user feedback 116, which is then provided to the reinforcement-learning processor 118, a malicious-content scorer 120, an LLM-generated scorer 122, and a discriminator 124.

The user feedback 116 is then combined with and associated with the messages 102 to generate labeled data that is used as training data by the reinforcement-learning processor 118 to train and update the ML methods used in the malicious-content scorer 120 and/or the LLM-generated scorer 122.

The alternative systems illustrated in FIGS. 1A and 1B are non-limiting examples of several variations of the two-step Bayesian approach. In FIG. 1A, the malicious-content scorer 106 is performed in series with the LLM-generated discriminator 110, whereas, in FIG. 1B, the malicious-content scorer 120 is performed in parallel with the discriminator 124. Consequently, the input to the LLM-generated discriminator 110 is the selected messages 108, which is a subset of all messages 102, whereas the input to the LLM-generated scorer 122 is all messages 102. For example, the selected messages 108 can be the subset of the messages 102 that contains those messages having first scores greater than the first threshold. Generally, an ML method is trained using training data that is the same type as will be used as an input in practice. Thus, the LLM-generated discriminator 110 can be trained using a restricted set of training data that includes only messages for which the first score exceeds the first threshold. In contrast, the LLM-generated scorer 122 can be trained using a complete set of training data.

The two-step Bayesian approach, which is illustrated by the non-limiting examples in FIGS. 1A and 1B, has several advantages over other approaches. The two-step Bayesian approach has the advantage that it can capture LLM-generated phishing emails that may elude other methods that do not inquire into the likelihood that the email is LLM generated.

The two-step Bayesian approach has the advantage that it can be easily combined with existing methods to detect malicious messages. For example, an existing method discriminating/detecting malicious content can be used for either the malicious-content scorer 106 or the malicious-content scorer 120. The two-step Bayesian approach then augments the existing method with the additional information provided by either the LLM-generated discriminator 110 or the LLM-generated scorer 122, which enables the malicious message classifying system 100 to capture malicious content that can elude the existing method by itself.

The two-step Bayesian approach has the advantage that it can straightforwardly integrate the inquiry regarding whether the message is generated by an LLM with other approaches that detect malicious messages. The advances in LLM technologies create new challenges for detecting malicious messages, making it beneficial to be able to integrate solutions to these new challenges into existing detection frameworks. The two-step Bayesian approach provides such an integration by performing the inquiry regarding whether messages are generated by an LLM either in series or in parallel with the other approaches. The two-step Bayesian approach also has the benefit that it can be continuously updated and refined via user-feedback reinforcement learning, thereby adapting to changes and advancements in LLM technologies.

The two-step Bayesian approach uses additional information provided by inquiring whether messages appear to have been generated using an LLM to better detect malicious messages. The initial inquiry of whether a message is malicious may result in borderline cases that are not clearly malicious messages, especially for messages that are generated by using an LLM, which can obscure common indicators that the message is malicious. For these borderline cases, the additional information that the messages were generated using an LLM can be sufficient to clarify that the messages are a likely to be malicious messages.

To illustrate, consider that, for the borderline cases, the first score for a given message can represent a 60% likelihood of being a malicious message, and the second score represents 70% likelihood that the given message was generated by an LLM. Then the combination of scores, can be used to infer an 80% likelihood of the given message being a malicious message because the additional information that the message is likely LLM generated increases the likelihood that it is a malicious message due to the correlation between the message being LLM generated and being malicious.

Figure 2A:
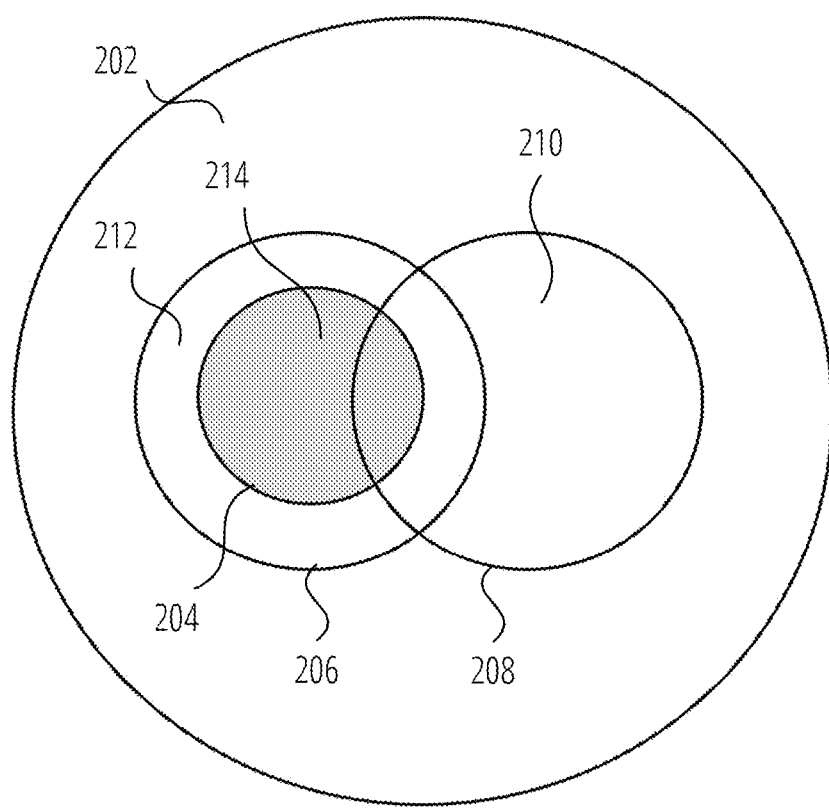
FIG. 2A illustrates an example Venn diagram for various subsets of messages, in accordance with certain embodiments.
Figure 2B:
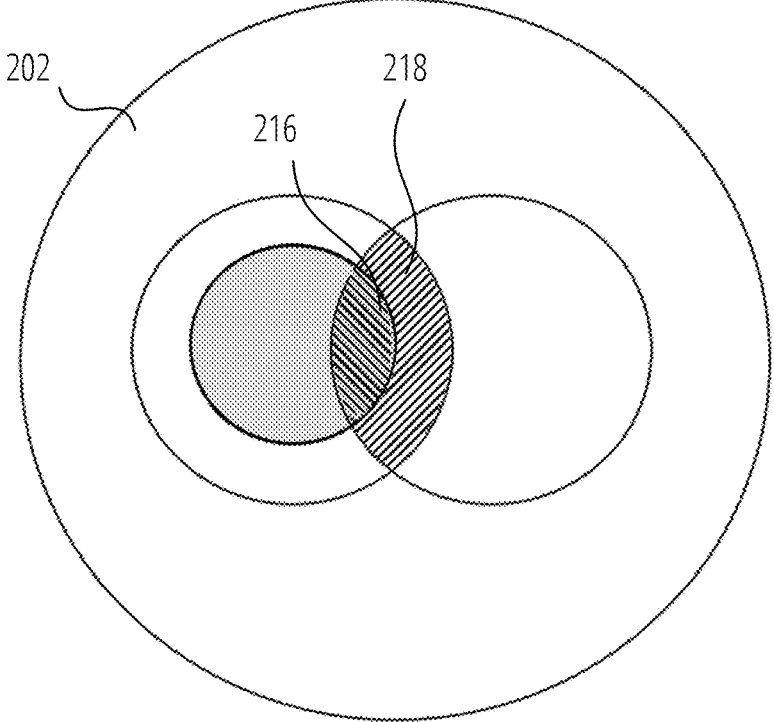
FIG. 2B illustrates another Venn diagram for various other subsets of messages, in accordance with certain embodiments.

The system and method for detecting malicious messages can be better understood by considering the Venn diagram representing all messages 202, which is illustrated in FIGS. 2A and 2B. As discussed above, a first score (e.g., a malicious-content scorer 106) can be generated for each message, representing a likelihood that each message is a malicious message (e.g., a phishing email). Different thresholds can be set for this first score. The first boundary 206 demarks a boundary for a first threshold applied to the messages based on the first score. The first subset 212 inside the first boundary 206 represents those messages for which the first score exceeds the first threshold. For example, the first threshold corresponding to the first boundary 206 can be selected such that 70% of the messages in the first subset 212 are malicious messages. A network administrator can select another threshold based on a risk tolerance for malicious messages within an enterprise system.

A second score (e.g., an LLM-generated scorer 122) can also be generated, representing a likelihood that each message is generate by an LLM. Different thresholds can be set for this second score. The second boundary 208 demarks a boundary for a second threshold applied to the messages based on the second score. The second subset 210 inside the second boundary 208 indicates those messages for which the second score exceeds the second threshold. For example, the second threshold corresponding to the second boundary 208 can be selected such that 75% of the messages in the second subset 210 are messages generated by an LLM.

For example, the third boundary 204 represents a boundary demarking a third threshold, and the third subset 214 within the third boundary 204 are messages for which the first score exceeds a third threshold. The third threshold is higher than the first threshold, such that the third threshold represents a higher likelihood of the messages being malicious messages. For example, 90% of the messages in the third subset 214 can be malicious messages.

Assuming a rule in which a given remediating action is taken for the set of messages for which 90% of the messages are likely to be malicious messages. For this rule, the messages in the third subset 214 could be marked for the given remediating action.

Additional information related to the second score is available that is not yet been used in applying the above rule. FIG. 2B shows two sets of messages-subset 4a 218 and subset 4b 216—that make a fourth subset that is defined as the intersection of the first subset 212 and the second subset 210. Like the third subset 214, 90% of the messages in this fourth subset can also be malicious messages. Being LLM generated increases the likelihood that a somewhat suspicious message is likely to be malicious. Therefore, an inference can be made that having relatively high values for both the first score and the second score is a strong indicator that messages are malicious. Thus, a two-step Bayesian inference using both the first score and the second score captures subset 4a 218 as also falling under the rule that "remediating action is taken for the set of messages for which 90% of the messages are likely to be malicious messages." That is, the two-step Bayesian approach additional captures the subset 4a 218, which is outside of the third subset 214. Thus, in accordance the above rule, subset 4a 218 is also marked for the given remediating action.

Using both the first score and the second score has the benefit of capturing additional messages (i.e., subset 4a 218) that would not be captured using only the first score. In the Venn diagram shown in FIGS. 2A-2C the areas of the respective subset are not necessarily representative of the number of messages within the respective subsets. For example, over time the number of LLM generated phishing emails may significantly increase and the LLM generated phishing emails may become increasingly difficult to detect using the score alone, resulting in far more phishing emails in subset 4a 218 than in the third subset 214.

Figure 2C:
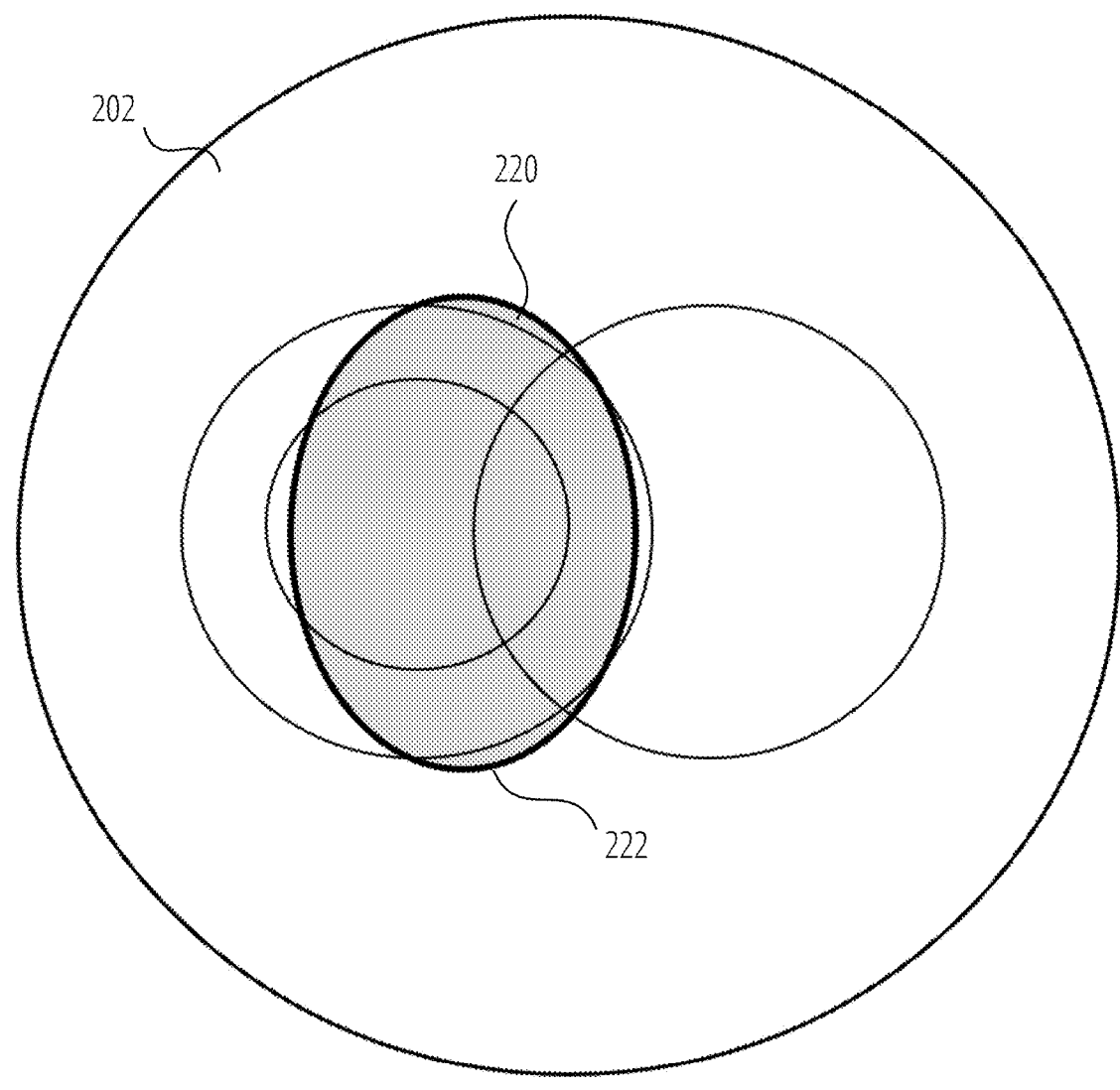
FIG. 2C illustrates another Venn diagram for various additional subsets of messages, in accordance with certain embodiments.

FIG. 2C shows a fifth subset 220 defined by a fifth boundary 222. For example, this fifth boundary 222 can be defined using a function of both the first score and the second score. The likelihood of a message being malicious may be inferred using a sliding scale in which a high value of the second score offsets a lower value of the first score and vice versa. For example, the first score "X" and the second score "Y" can be combined to form a third score "Z," e.g., $$Z(X, Y) = |aX + Y| \text{ or}$$

$$Z(X, Y) = aX^n + Y^n,$$

where "a" is a scaling constant and "n" is an exponent. Then the fifth boundary 222 can be defined by comparing the third score to a given threshold. This combination of the first score and the second score can be used in rules defining what remediating action to take for sets of messages that are determined likely to be malicious messages. For example, using the third score "Z," a fifth subset 220 using a boundary defined by applying a threshold to the third score corresponding to 90% of the messages within the boundary being malicious messages. This fifth subset 220 can have the advantage of capturing more messages that are outside of each of the third subset 214 and fourth subset. The fifth subset 220 illustrates how the first score and second score can be combined to further improve the discrimination of malicious messages.

For any of the first, second, or third scores, the choice of threshold can be informed by the risk tolerances of the enterprise or organization monitoring for malicious messages. For example, one organization can choose a threshold that marks as suspicious emails with a combination of the first score and the second indicating a likelihood of 90% or greater that the email is malicious. Another organization with a lower risk tolerance can choose a threshold that marks as suspicious emails with a combination of the first score and the second indicating a likelihood of 80% or greater that the email is malicious. A third organization can choose the thresholds based on intuition without knowing to which percentage of the likelihood the threshold corresponds. Thus, the choice of thresholds for the first and second scores can be adapted in accordance with organizational preferences and risk tolerances.

Further, more than one threshold can be used for each of the scores, such that different thresholds can correspond to different markings and/or different remediating actions. Those messages that are above a given threshold can be flagged or subject to additional actions or different levels of scrutiny. For example, different thresholds can be set for escalating levels of remediating actions. For the case in which the malicious messages are phishing emails, a lowest level of action can be labeling the emails with a warning that alerts users to the suspected malicious nature of the emails. At a second level, the remediating action can be to quarantine the emails and/or prevent opening links in the emails, unless a user takes knowing action to declare the emails as safe. At a third level, the remediating action can be to alert a network administrator regarding the suspicious nature of the emails, such that the network administrator can decide what action to take regarding the emails.

FIG. 3 illustrates an example method 300 for detecting malicious messages using a two-step Bayesian inference process. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

Large language models (LLMs) such as CHATGPT can be used to draft phishing emails or other malicious messages, increasing the difficulty of their detection. Method 300 applies a two-step Bayesian approach, which can be integrated with other methods for detecting phishing emails. In one step, method 300 processes emails and assigns a first score related to a likelihood of the emails being phishing emails. In another step, method 300 processes emails (or a subset of the emails) and assigns a second score related to a likelihood of the emails having been generated by an LLM. For example, in one variation, a subset of emails suspected of being phishing emails (e.g., more than would be typically flagged as phishing) are processed by a second ML algorithm and assigned a second score related to a likelihood they were generated using an LLM. A high value for the second score can elevate borderline suspicious emails to highly suspicious. Thus, some phishing emails that based on the first score alone would not previously have been flagged as phishing emails can now be flagged as phishing emails. This is because the combination of a high/medium value for the second score coupled with the medium first score can indicate a statistically significant likelihood that the email in question is a phishing email.

In step 302, method 300 determines a first score for respective messages, and the first score represents a likelihood that a message is a malicious message. For example, the first score can be generated by the malicious-content scorer 106, as discussed in reference to FIG. 1A. Alternatively, the first score can be generated by the malicious-content scorer 120, as discussed in reference to FIG. 1B.

In step 304, method 300 selects a first set of the messages based on the corresponding first score exceeding a first threshold. For example, as illustrated in FIG. 1A, the selected messages 108 can be provided by selecting those messages for which the first score exceeds a first threshold. Step 304 can be omitted in various implementations such as the example illustrated in FIG. 1B in which the malicious-content scorer 120 performs in parallel with the LLM-generated scorer 122.

In step 306, method 300 determines a second score representing a likelihood that a message is generated using a machine learning (ML) method such as an LLM. For example, in FIG. 1A, the second score can be generated for a subset of messages in the selected messages 108. Alternatively, in FIG. 1B, the second score can be generated for all messages 102.

In step 308, method 300 signals that one or more messages are suspected to be malicious messages, and these can be marked/flagged as such, thereby providing the marked messages 112. The one or more messages that are suspected of containing malicious content can be determined using both the first score and the second score. For example, various approaches for using the first score and the second score to determine subsets of the messages 102 (e.g., all messages 202), which subsets contain messages that are suspected of being malicious. Any of these various approaches or any combination thereof can be used to select the marked messages 112 from the messages 102.

For example, one subset that is included in the marked messages 112 can be determined based on the first score exceeding the first threshold and the second score exceeding the second threshold second.

In step 310 of method 300, user feedback 116 is received regarding which of the messages are malicious messages. For example, user feedback 116 can be received as discussed above in reference to the user feedback interface 114 with respect to FIGS. 1A and 1B.

In step 312, method 300 performs reinforcement learning based on the user feedback 116 to refine the processes used to determine the first score and/or the second score. For example, the user feedback 116 can be used by the reinforcement-learning processor 118 as discussed above in reference to FIGS. 1A and 1B.

Figure 4A:
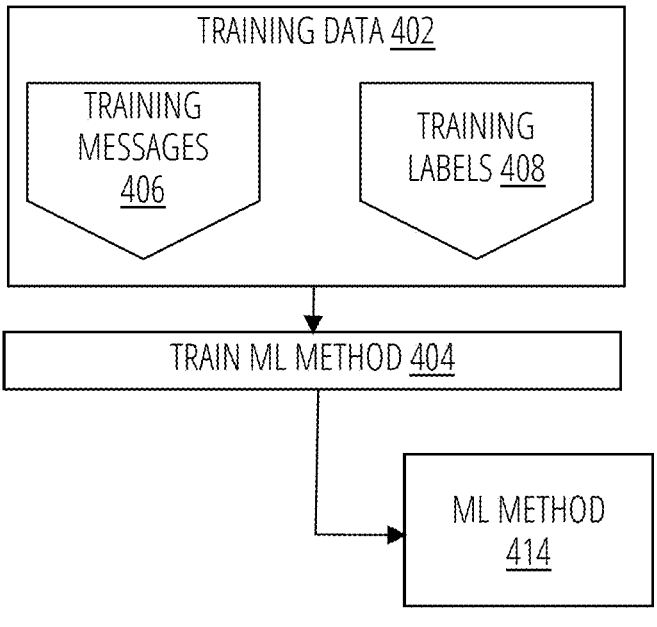
FIG. 4A illustrates a block diagram for training a machine learning (ML) method, in accordance with certain embodiments.

FIG. 4A illustrates an example of training an ML method 414 (e.g., the malicious-content scorer 106, LLM-generated discriminator 110, malicious-content scorer 120, or the LLM-generated scorer 122). In block 404, training data 402, which includes the training labels 408 and the training messages 406) is applied to train the ML method 414. For example, the ML method 414 can be an artificial neural network (ANN) that is trained via supervised learning using a backpropagation technique to train the weighting parameters between nodes within respective layers of the ANN. In supervised learning, the training data 402 is applied as an input to the ML method 414, and an error/loss function is generated by comparing the output from the ML method 414 with the training labels 408. The coefficients of the ML method 414 are iteratively updated to reduce an error/loss function. The value of the error/loss function decreases as outputs from the ML method 414 increasingly approximate the training labels 408. In other words, ANN infers the mapping implied by the training data, and the error/loss function produces an error value related to the mismatch between the training labels 408 and the outputs from the ML method 414 that are produced as a result of applying the training messages 406 to the ML method 414.

To overcome the challenges presented by LLM-generated phishing emails (and other malicious messages), a two-step Bayesian inference approach can be used to detect which emails are likely to be phishing emails and which emails are likely to be LLM-generated emails. For example, a first ML method can be trained using a first set of training data that is labeled according to which emails are phishing emails and which are not. Thus, the first ML method learns patterns to detect phishing emails from a general body/corpus of emails.

A second ML method can be trained using a second set of training data that is labeled according to whether the emails were generated using an LLM. Thus, the second ML method learns patterns to detect LLM-generated emails. Several variations of the second ML method are contemplated. In one variation, the second ML method learns patterns to detect LLM-generated emails from a general body/corpus of emails (e.g., the same set of training data as used to train the first ML method, except the labels indicate which emails are LLM-generated, rather than indicating which emails are phishing emails). The LLM-generated scorer 122 is an example of a second ML method that would be trained using training data that includes a general body/corpus of emails. That is, training data that includes a general body/corpus of emails can be used, e.g., in the parallel configuration for the malicious-content scorer 120 and the LLM-generated scorer 122, which is illustrated in FIG. 1B.

In another variation of the two-step Bayesian inference approach (e.g., the variation illustrates in FIG. 1A in which the malicious-content scorer 106 is performed in series with the LLM-generated discriminator 110), the training data for the second ML method is subset of general body/corpus of emails that has been selected according to a set of criteria. For example, the criteria can be that the emails in the subset have a first score that is greater than a first threshold. Accordingly, when a second set of training data is selected from a first set that is a general body/corpus of emails used to train the first ML method, the second set of training data can be those emails from the first set of training data for which first score that is greater than a first threshold. The training data for a given ML method should resemble the inputs that will be applied to the ML method when used in practice. On the one hand, if in practice the input to the second ML method is a general corpus of emails, then the training data should be representative of a general corpus of emails. On the other hand, if in practice the input to the second ML method is limited to emails that satisfy one or more criteria (e.g., emails having a first score that exceeds the first threshold), then the training data should be representative of emails selected from a general corpus of emails that satisfy the one or more criteria.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., BroydenFletcher-Goldfarb-Shannon, one step secant, and Levenberg-Marquardt), or a conjugate gradient method (e.g., Fletcher-Reeves update, Polak-Ribiére update, PowellBeale restart, and scaled conjugate gradient). Additionally, evolutionary methods, such as gene expression programming, simulated annealing, expectation-maximization, nonparametric methods and particle swarm optimization, can also be used for training the ML method 414.

The training 404 of the ML method 414 can also include various techniques to prevent overfitting to the training data 402 and for validating the trained ML method 414. For example, boot strapping and random sampling of the training data 5402 can be used during training.

In addition to supervised learning used to initially train the ML method 414, the ML method 414 can be continuously trained while being used by using reinforcement learning based on the network measurements and the corresponding configurations used on the network. The ML method 414 can be cloud based and can be trained using network measurements and the corresponding configurations from other networks that provide feedback to the cloud.

Further, other machine learning (ML) algorithms can be used for the ML method 414, and the ML method 414 is not limited to being an ANN. For example, there are many machine-learning models, and the ML method 414 can be based on machine learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 4B:
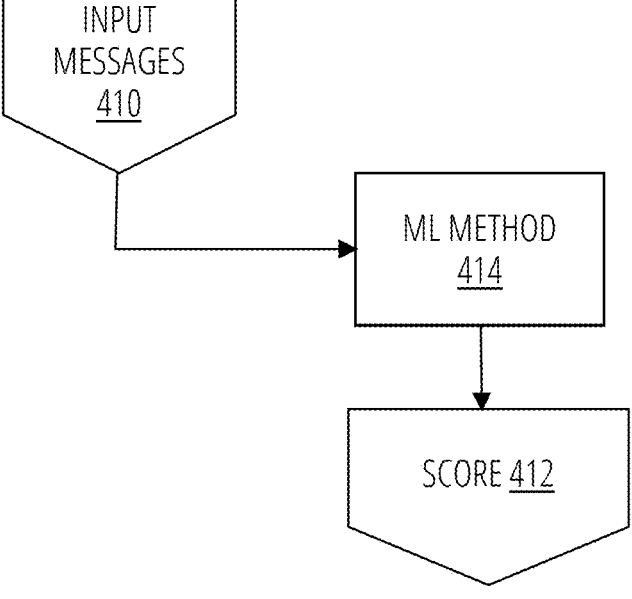
FIG. 4B illustrates a block diagram for using the ML method, in accordance with certain embodiments.

FIG. 4B illustrates an example of using the trained ML method 414. The input messages 410 are applied to the trained ML method 414 to generate the outputs, which can include the score 412.

Figure 5:
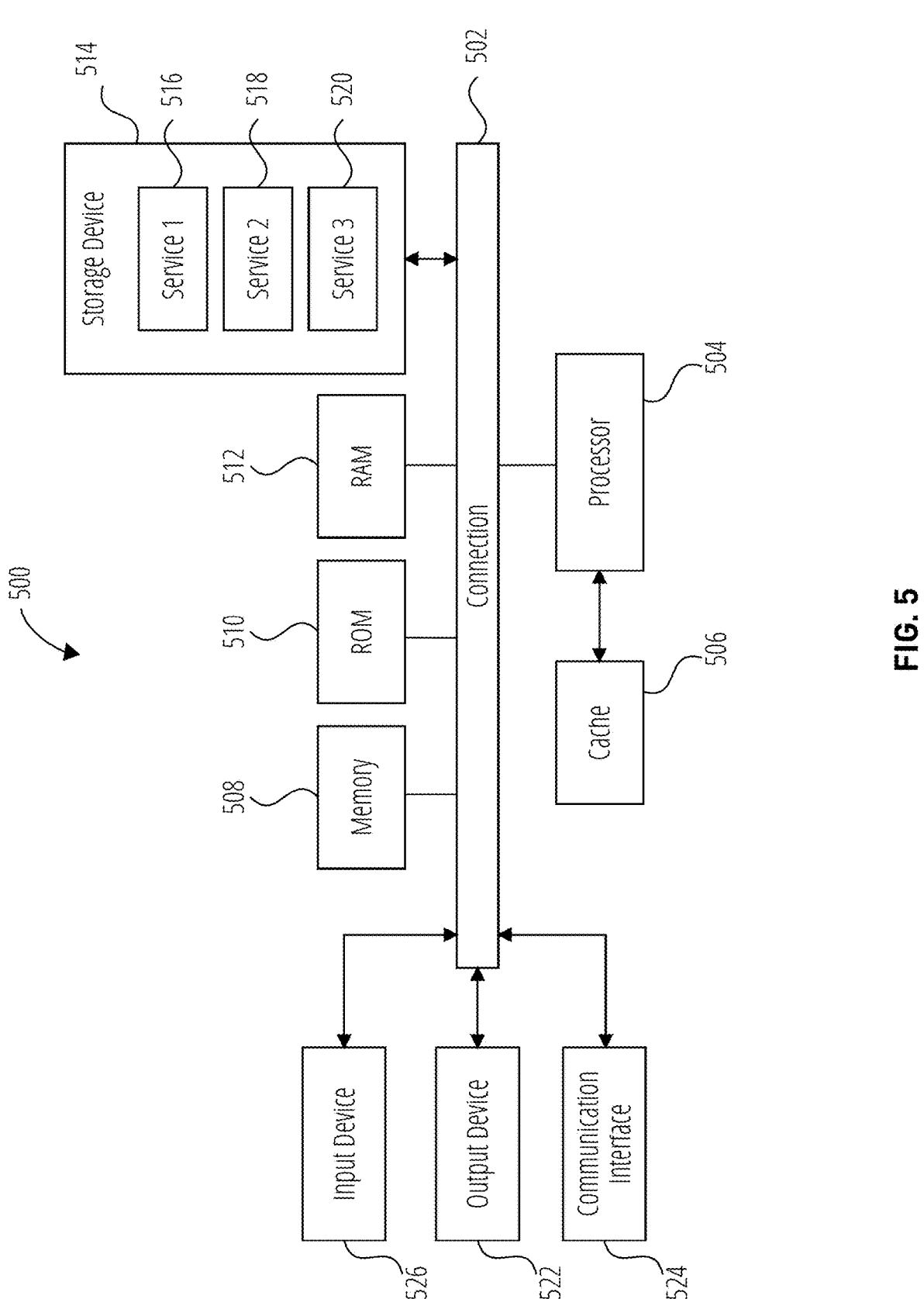
FIG. 5 illustrates a block diagram of an example of a computing device, in accordance with certain embodiments.

FIG. 5 shows an example of computing system 500, which can be for example any computing device making up the malicious message classifying system 100 or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any genera-purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of the malicious message classifying system 100 and perform one or more functions of method 300 when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of detecting malicious messages, the method comprising:

determining, using a discrimination engine, a first score for a plurality of messages, wherein, for a respective message, a corresponding value of the first score represents a likelihood that the respective messages is a malicious message;

determining a first subset of the plurality of messages for which the first score of each respective message exceeds a first threshold;

determining, using the discrimination engine, a second score for the first subset of messages of the plurality of messages, wherein, for the respective message, a corresponding value of the second score represents a likelihood that the respective message has been generated using one or more machine learning (ML) methods;

determining a second subset of the plurality of messages for which the second score of each respective message in the first subset exceeds a second threshold;

signaling that the second subset are suspected to be malicious messages;

determining a third subset of the plurality of messages for which the first score exceeds a third threshold that is greater than the first threshold, wherein the third subset is determined without comparing the second score to the second threshold; and including the third subset in the one or more messages that are signaled as being suspected to be malicious messages.

2. The method of claim 1, further comprising:

determining the second score for the set of messages, wherein the of message includes all messages of the plurality of messages.

3. The method of claim 2, further comprising:

determining a subset of the plurality of messages for which each message of the subset has the first score that exceeds a first threshold and has the second score that exceeds a second threshold; and including the subset in the one or more messages that are signaled as being suspected to be malicious messages.

4. The method of claim 1, wherein determining the first score further comprises determining the first score to represent a likelihood that the message is a phishing email; and signaling the one or more messages are suspected to be malicious messages further comprises signaling the one or more messages are suspected to be phishing emails.

5. The method of claim 1, wherein determining the first score further comprises determining the first score to represent a likelihood that the message is a social-media message conveying misinformation; and signaling the one or more messages are suspected to be malicious messages further comprises signaling the one or more messages are suspected to be social-media messages conveying misinformation.

6. The method of claim 1, wherein determining the first score further comprises determining the first score to represent a likelihood that the message is a review of a product from a non-user of the product; and signaling the one or more messages are suspected to be malicious messages further comprises signaling the one or more messages are suspected to be fake reviews of the product.

7. The method of claim 1, wherein:

the discrimination engine comprises a first ML method and a second ML method;

the first ML method determines the first score; and the second ML method determines the second score, the second ML method having been trained to discriminate whether messages are generated by a large language model (LLM) by using training data that comprises training messages that are labeled according to whether the training messages were generated by one or more LLMs.

8. The method of claim 1, further comprising:

receiving user feedback indicating which of the plurality of messages that are suspected to be malicious messages are malicious messages; and performing reinforcement learning on the discrimination engine based on the received user feedback.

9. The method of claim 1, further comprising:

receiving user feedback indicating which of the plurality of messages that are suspected to be malicious messages have been generated using the one or more ML methods; and performing reinforcement learning on the discrimination engine based on the received user feedback.

10. The method of claim 1, wherein signaling that the one or more messages are suspected to be malicious messages further comprises:

providing, in a user interface, a visual indicator that the one or more messages are suspected to be malicious messages;

receiving, from the user interface, a user input that indicates whether the respective messages of the one or more messages are malicious messages or have been generated using the one or more ML methods.

11. A computing apparatus comprising:

a processor; and a memory storing instructions that, when executed by the processor, configure the apparatus to:

determine a first score for a plurality of messages for a plurality of messages, a discrimination engine of the apparatus being configured to determine the first score, wherein, for a respective message, a corresponding value of the first score represents a likelihood that the respective messages is a malicious message;

determine a first subset of the plurality of messages for which the first score of each respective message exceeds a first threshold;

use the discrimination engine to determine a second score for the first subset of messages of the plurality of messages, wherein, for the respective message, a corresponding value of the second score represents a likelihood that the respective message has been generated using one or more machine learning (ML) methods;

determine a second subset of the plurality of messages for which the second score of each respective message in the first subset exceeds a second threshold;

signal that the second subset are suspected to be malicious messages;

determine a third subset of the plurality of messages for which the first score exceeds a third threshold that is greater than the first threshold, wherein the third subset is determined without comparing the second score to the second threshold; and include the third subset in the one or more messages that are signaled as being suspected to be malicious messages.

12. The computing apparatus of claim 11, wherein, when executed by the processor, the stored instructions further configure the processor to:

determine the second score for the set of messages, wherein the of message includes all messages of the plurality of messages;

determine a subset of the plurality of messages for which each message of the subset has the first score that exceeds a first threshold and has the second score that exceeds a second threshold; and include the subset in the one or more messages that are signaled as being suspected to be malicious messages.

13. The computing apparatus of claim 11, wherein, when executed by the processor, the stored instructions further configure the processor to:

determine the first score further comprises determining the first score to represent a likelihood that the message is a phishing email, and signal the one or more messages are suspected to be malicious messages further comprises signaling the one or more messages are suspected to be phishing emails; or determine the first score further comprises determining the first score to represent a likelihood that the message is a social-media message conveying misinformation, and signal the one or more messages are suspected to be malicious messages further comprises signaling the one or more messages are suspected to be social-media messages conveying misinformation; or determine the first score further comprises determining the first score to represent a likelihood that the message is a review of a product from a non-user of the product, and signal the one or more messages are suspected to be malicious messages further comprises signaling the one or more messages are suspected to be fake reviews of the product.

14. The computing apparatus of claim 11, wherein:

the discrimination engine comprises a first ML method and a second ML method;

the first ML method determines the first score; and the second ML method determines the second score, the second ML method having been trained to discriminate whether messages are generated by a large language model (LLM) by using training data that comprises training messages that are labeled according to whether the training messages were generated by one or more LLMs.

15. The computing apparatus of claim 11, wherein, when executed by the processor, the stored instructions further configure the processor to:

receive user feedback regarding a suspected message of the one or more messages that are signaled as suspected to be malicious messages, the user feedback indicating whether the suspected message is a malicious message or whether the suspected message has been generated using the one or more ML methods; and performing reinforcement learning on the discrimination engine based on the received user feedback.

16. The computing apparatus of claim 11, wherein, when executed by the processor, the stored instructions further configure the processor to:

provide, in a user interface, a visual indicator that the one or more messages are suspected to be malicious messages;

receive, from the user interface, a user input that indicates whether the respective messages of the one or more messages are malicious messages or have been generated using the one or more ML methods.

* * * * *